US006591729B1

(12) United States Patent
Novak

(10) Patent No.: US 6,591,729 B1
(45) Date of Patent: Jul. 15, 2003

(54) PORTABLE BAND SAW FOR CUTTING MEAT

(76) Inventor: Gregory M. Novak, R.R. 2 Box 580, Honesdale, PA (US) 18431

( * ) Notice: Subject to any disclaimer, the term of this patent is extended or adjusted under 35 U.S.C. 154(b) by 0 days.

(21) Appl. No.: 09/590,452

(22) Filed: Jun. 9, 2000

(51) Int. Cl.⁷ .............................................. B27B 13/00
(52) U.S. Cl. ............................. 83/788; 83/859; 83/816
(58) Field of Search .......................... 83/788, 799, 801, 83/803, 804, 809, 810, 811, 813, 814, 816, 817, 932, 859, 818; 30/380

(56) References Cited

U.S. PATENT DOCUMENTS

| | | | | | |
|---|---|---|---|---|---|
| 178,758 A | * | 6/1876 | Gerard | ........................ | 83/816 |
| 181,107 A | | 8/1876 | Sanson | ........................ | 83/818 |
| 382,330 A | * | 5/1888 | Snedeker | ........................ | 83/788 |
| 780,425 A | * | 1/1905 | Hinkley | ........................ | 83/818 |
| 881,107 A | * | 3/1908 | Carey | ........................ | 83/816 |
| RE15,294 E | * | 2/1922 | Lofgren | ........................ | 30/380 |
| 1,449,015 A | * | 3/1923 | Schenkel | ........................ | 83/816 |
| 1,449,805 A | * | 3/1923 | Arnold et al. | ........................ | 30/380 |
| 1,530,682 A | * | 3/1925 | Lyman | ........................ | 30/380 |
| 1,704,428 A | * | 3/1929 | Dempewolf et al. | ........................ | 83/818 |
| 1,757,785 A | * | 5/1930 | Sullenberger | ........................ | 83/810 |
| 1,793,461 A | | 2/1931 | Biro | ........................ | 83/716 |
| 1,864,517 A | | 6/1932 | Biro | ........................ | 83/818 |
| 1,879,145 A | | 9/1932 | Erickson | ........................ | 83/818 |
| 2,525,004 A | * | 10/1950 | Spang | ........................ | 83/817 |
| 2,525,650 A | * | 10/1950 | Gaibel | ........................ | 241/300 |
| 2,625,964 A | * | 1/1953 | Green et al. | ........................ | 83/818 |
| 2,627,288 A | * | 2/1953 | Steiner | ........................ | 83/810 |
| 2,705,510 A | * | 4/1955 | Stocke | ........................ | 83/811 |
| 2,744,547 A | * | 5/1956 | Sevetz, Sr. | ........................ | 83/811 |
| 2,798,518 A | * | 7/1957 | Gray | ........................ | 83/788 |
| 2,850,055 A | * | 9/1958 | Lasar | ........................ | 83/788 |
| 3,084,723 A | * | 4/1963 | Hack | ........................ | 83/788 |
| 3,390,598 A | | 7/1968 | Sands et al. | ........................ | 83/820 |
| 3,508,590 A | * | 4/1970 | Sprague | ........................ | 83/788 |
| 3,797,353 A | * | 3/1974 | Calhan | ........................ | 83/718 |
| 3,913,436 A | * | 10/1975 | Orescan | ........................ | 83/809 |
| 4,312,253 A | * | 1/1982 | Johnson et al. | ........................ | 83/167 |
| 4,356,750 A | * | 11/1982 | Legler et al. | ........................ | 83/816 |
| 4,413,414 A | * | 11/1983 | Strzalka | ........................ | 83/817 |
| 4,608,892 A | * | 9/1986 | Noizet | ........................ | 83/788 |
| 4,817,245 A | * | 4/1989 | Melville | ........................ | 83/490 |
| 5,041,056 A | * | 8/1991 | Hutton | ........................ | 83/788 |
| 5,193,518 A | * | 3/1993 | Moller et al. | ........................ | 83/811 |
| 5,295,896 A | * | 3/1994 | Petersen | ........................ | 83/810 |
| 5,509,206 A | * | 4/1996 | Rowe et al. | ........................ | 30/380 |
| H1867 H | * | 10/2000 | Quiram | ........................ | 83/816 |

* cited by examiner

Primary Examiner—Allan N. Shoap
Assistant Examiner—Jason Prone
(74) Attorney, Agent, or Firm—John J. Elnitski, Jr.

(57) ABSTRACT

The present invention is a band saw for finish cutting of meats. The band saw is portable and disassembles into small parts. The band saw is small enough to fit on top of a table, permits easy transportation, and is easy to assembly and disassemble without tools. The band saw can be hosed down in a kitchen sink or taken apart to be washed in a kitchen sink, once any electrical components have been removed.

20 Claims, 21 Drawing Sheets

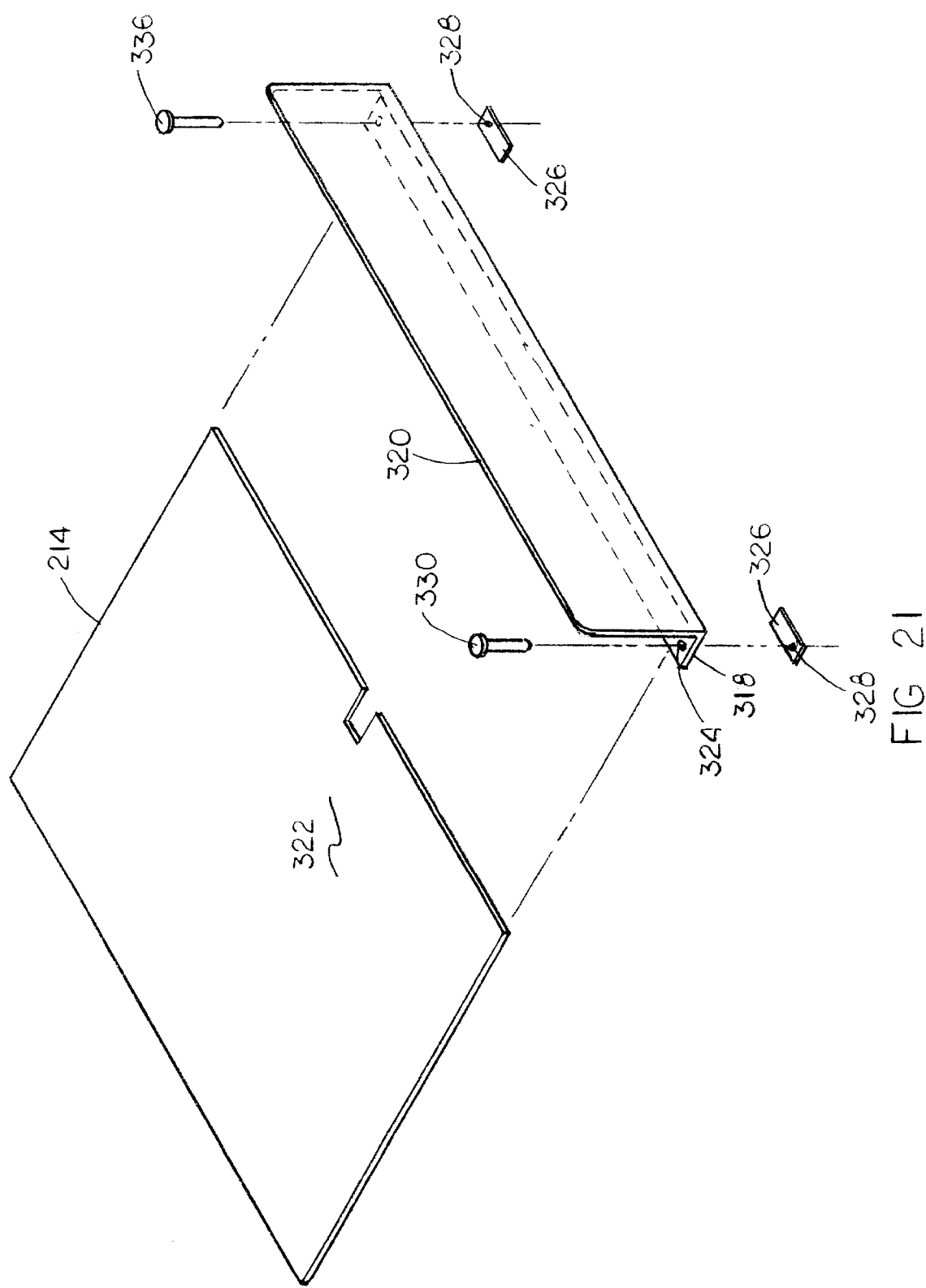

PORTABLE BAND SAW FOR CUTTING MEAT

BACKGROUND

Band saws are well known for their use for cutting meat. All band saws include a continuous or endless length saw blade in a closed loop configuration. Whereby, the saw blade passes over a driven wheel at one end of the loop configuration and at least one or more wheels at the other end of the loop configuration. The saw blade is continuously driven in a single direction about the wheels by the driven wheel, where a toothed edge of the saw blade is expose to the meat to be cut. Currently available are portable hand held and permanently located varieties of the band saw. Permanently located models are usually heavy, bulky, costly and require a permanent dedicated space. The portable hand held models are mainly devised for bulk type cutting and not for finish cutting of meat.

It is an object of the present invention to provide a portable device to finish cut meat.

It is an object of the present invention to provide a device to cut meat which can be disassembled, without tools, into small parts for washing, storage and transportation of the device.

SUMMARY OF THE INVENTION

The present invention is a band saw. The band saw includes an endless saw blade. The band saw includes a base having a front and rear; and an upper frame having a front and a rear, the rear of the upper frame pivotally connected to the rear of the base. There is a lower wheel mounted to the base near the front of the base to support movement of the saw blade; a middle wheel mounted near the rear of the base and upper frame to support movement of the saw blade; and an upper wheel mounted to the upper frame near the front of the upper frame to support movement of the saw blade. An adjustable support assembly between the base and upper frame supports the upper frame above the base and to allow adjustment of distance between the lower and upper wheels to provide tension on the saw blade, and to allow quick assembly and disassembly of the band saw. There is a cutting table to support an object to be cut attached to the base and a power source to drive the wheels.

BRIEF DESCRIPTION OF THE DRAWINGS

FIG. 21 is an exploded view of the stationary section of the band saw with the thickness guide according to the present invention.

DETAILED DESCRIPTION

The present invention is a band saw 10 for finish cutting of meats. The band saw 10 is portable and disassembles into small parts. The band saw. 10 is small enough to fit on top of a table, permits easy transportation, and is easy to assembly and disassemble without tools. The band saw 10 can be hosed down in a kitchen sink or taken apart to be washed in a kitchen sink, once any electrical components have been removed.

Figure 1:
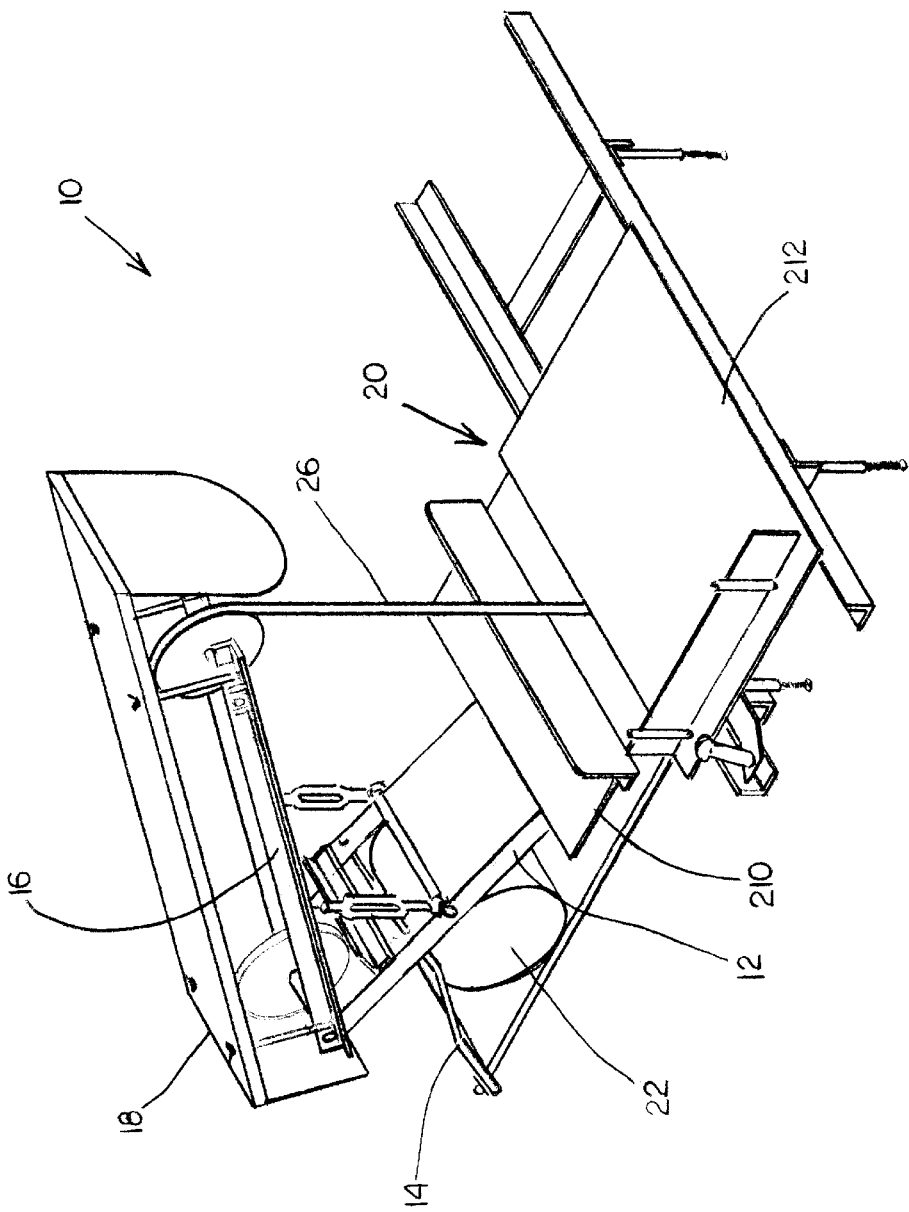
FIG. 1 is a front perspective view of a band saw according to the present invention.
Figure 2:
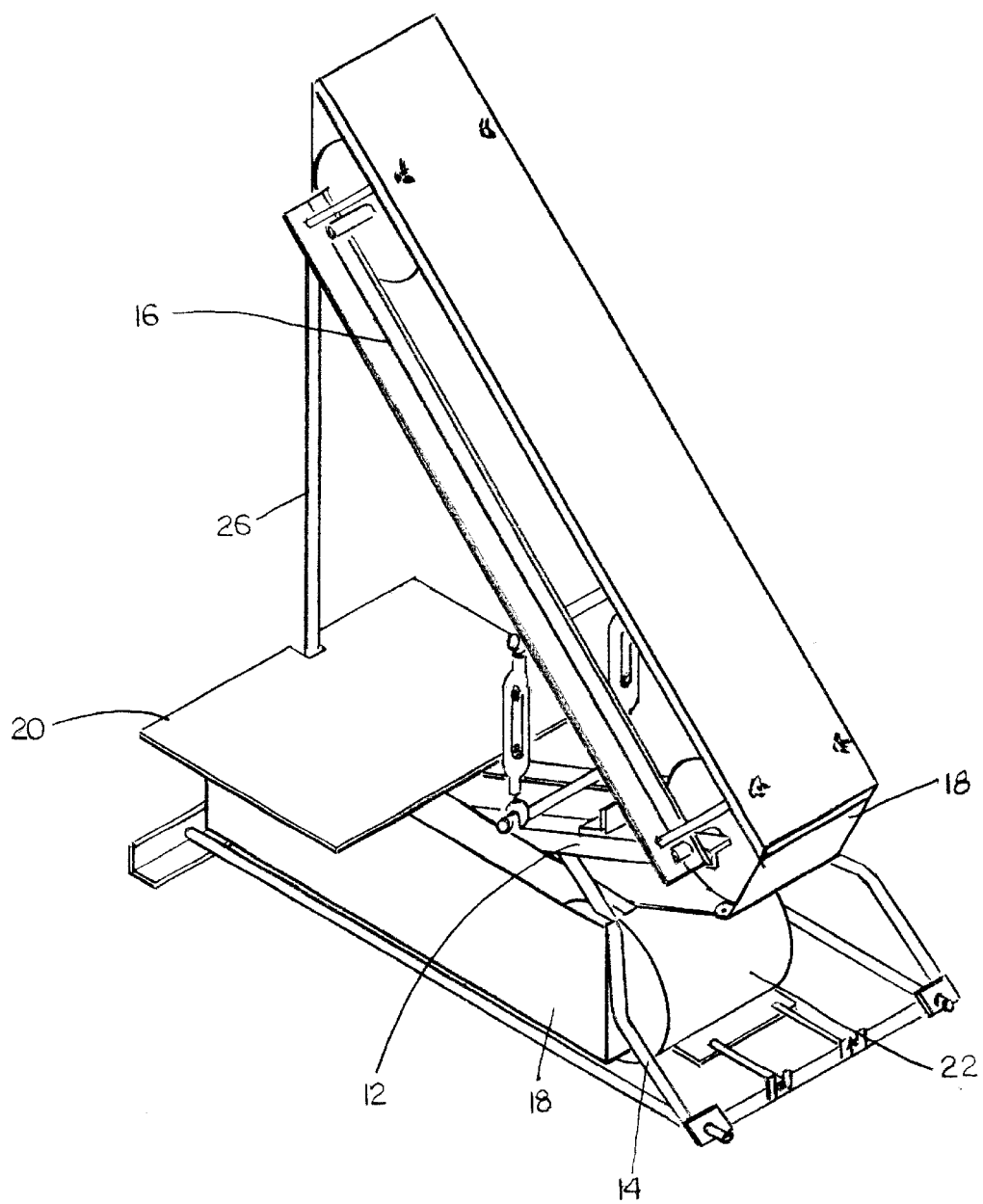
FIG. 2 is a rear perspective view of a band saw according to the present invention.
Figure 3:
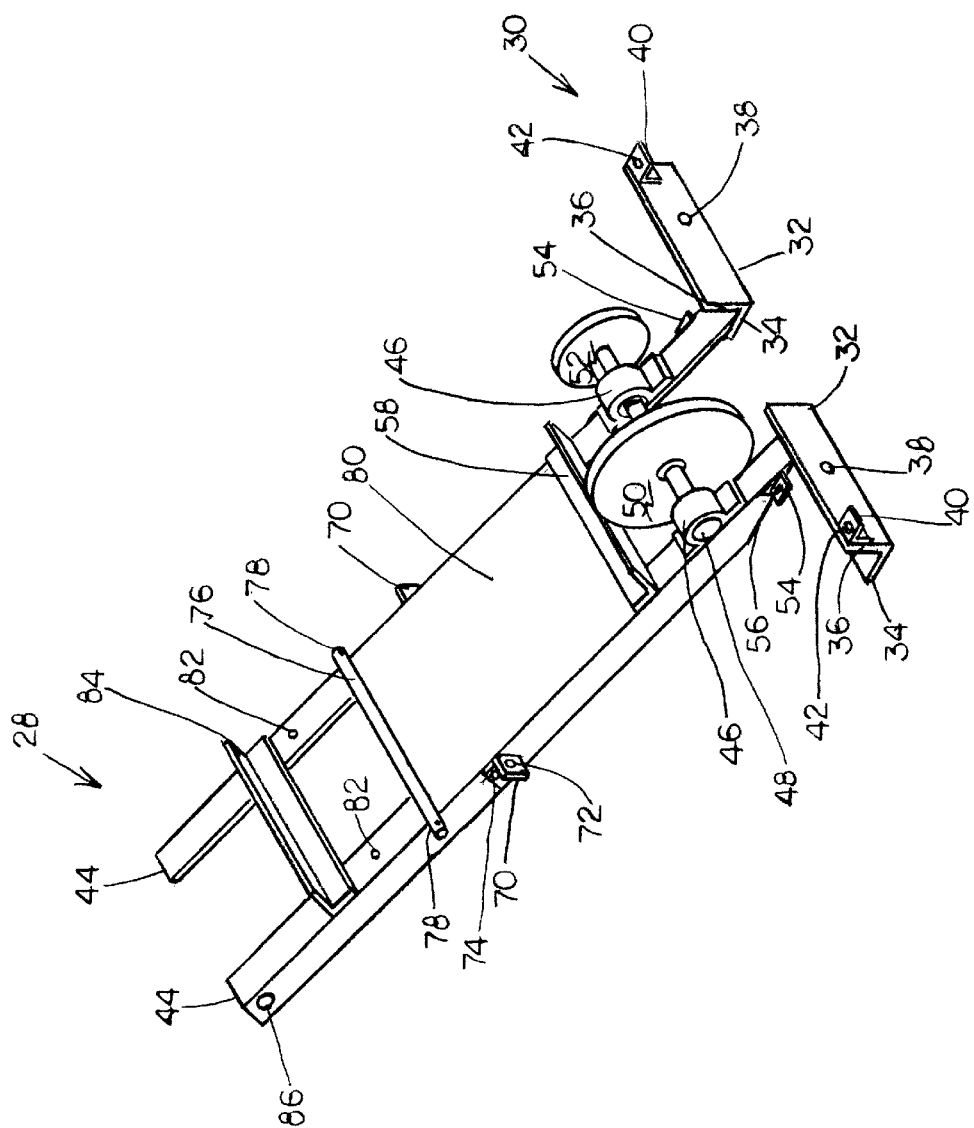
FIG. 3 is a front perspective view of a base of the band saw according to the present invention.

FIGS. 1 and 2 show a front and rear perspective view of the band saw 10. The components of the band saw 10 include a base 12, leg unit 14, upper frame 16, safety guards 18, cutting table 20, power source assembly 22 assembly and saw blade 26. All of the components are preferably made from stainless steel. The base 12 supports or connects to all the other components of the band saw 10. The base 12 is shown in FIG. 3 having a top 28 and a bottom 30. The bottom 30 includes two feet 32. Each foot 32 is made from L-shaped material having a horizontal leg 34 which rests on the surface supporting the band saw 10 and a vertical leg 36 extending upward from the horizontal leg 34. Each foot 32 includes a rod hole 38 in the vertical leg 36 and a foot rod bracket 40 with a rod hole 42 extending outward and away from the vertical leg 36. Extending from each foot 32 is a main support 44. Each main support 44 includes an axle bearing assembly 46 attached near the bottom of the base 12. Between the axle bearing assemblies 46 is a rotatable axle 48 with a lower wheel 50 mounted on the rotatable axle 48 between the main supports 44. A pulley 52 is mounted on one side of the rotatable axle 48 and is outside of the main supports 44. A lower main support rod bracket 54 with a rod hole 56 extends outward from the outside of each main support 44. The lower main support rod bracket 54 is located between axle bearing assembly 46 and the foot 32.

Figure 4:
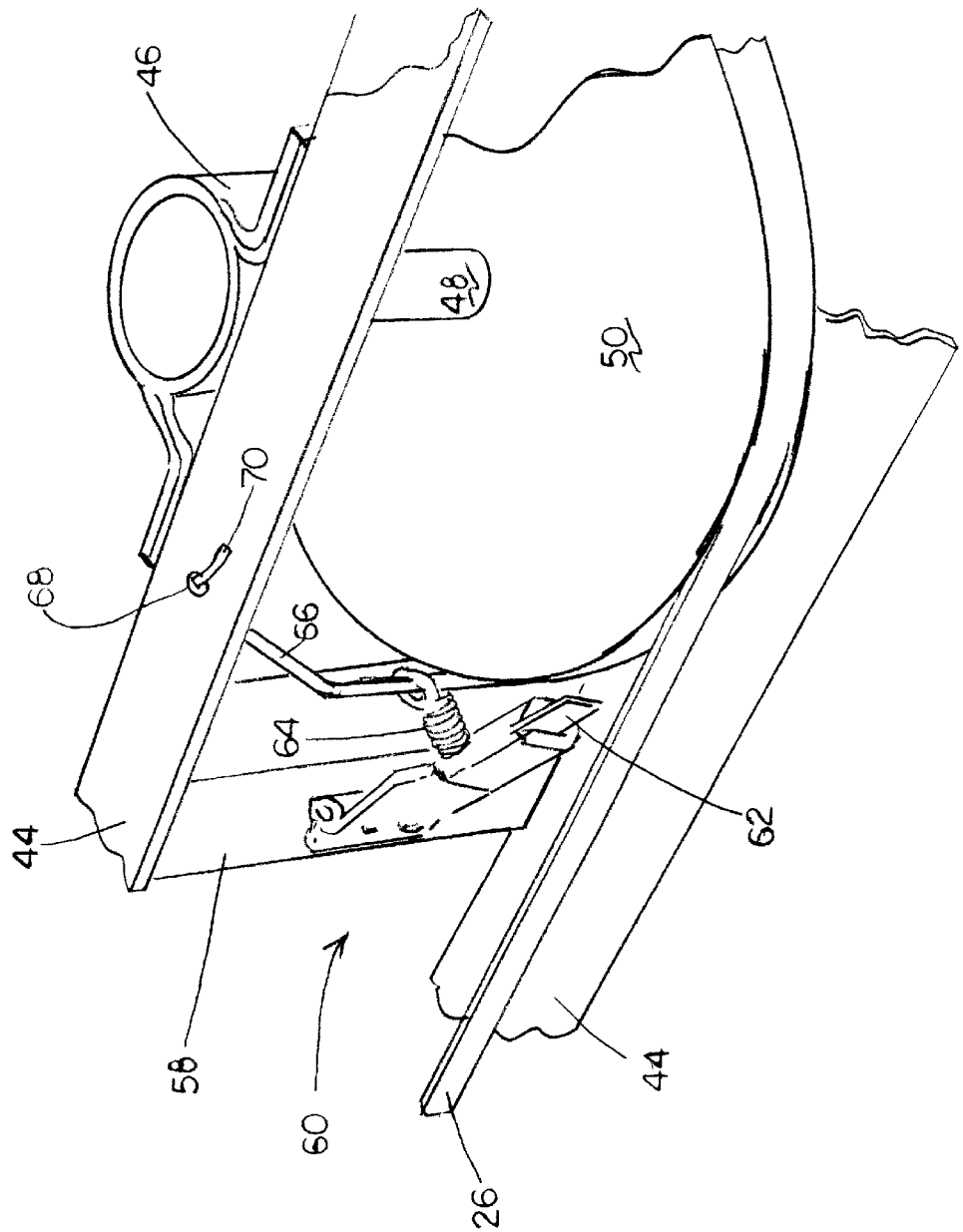
FIG. 4 is a bottom perspective view of a lower wheel of the band saw according to the present invention.

Mounted to each main support 44 and above the lower wheel 50 is a lower base cross member 58. The lower base cross member 58 connects the main supports 44 together and supports a scraper assembly 60. FIG. 4 shows a bottom view of the scraper assembly 60 for the lower wheel 50 which is hinged to the lower base cross member 58. The scraper 62 is biased toward the bottom of the lower wheel 50 by a spring 64 connected between the scraper 62 and a spring rod 66 above the scraper 62. The spring rod 66 is attached to the main supports 44 by inserting the spring rod 66 into holes 68 in the main supports 44. The ends 70 of the spring rod 66 are shown bent, so that the spring rod 66 does not fall from the main supports 44. The scraper 62 is used to remove anything clinging to the lower wheel 50. An upper main support rod bracket 70 extends outward from the outside of each main support 44 midway between the top 28 and bottom 30 of the base 12. The upper main support rod bracket 70 includes a rod hole 72 and can rotate about its mounting point 74. An upper frame support rod 76 with a pin hole 78 on each end is attached to the main supports 44 above the upper main support rod brackets 70. A cover plate 80 is attached to the main supports 44 between the upper frame support rod 76 and the lower base cross member 58. The cover plate 80 provides protection for and from the moving components below the base 12. A rod hole 82 is shown on the top of each main support 44 above the upper frame support rod 76. Mounted to each main support 44 and above the rod holes 82 is an upper base cross member 84. The upper base cross member 84 also connects the main supports 44 together. Above the upper base cross member 84 are axle holes 86 on the side of each main support 44.

Figure 5:
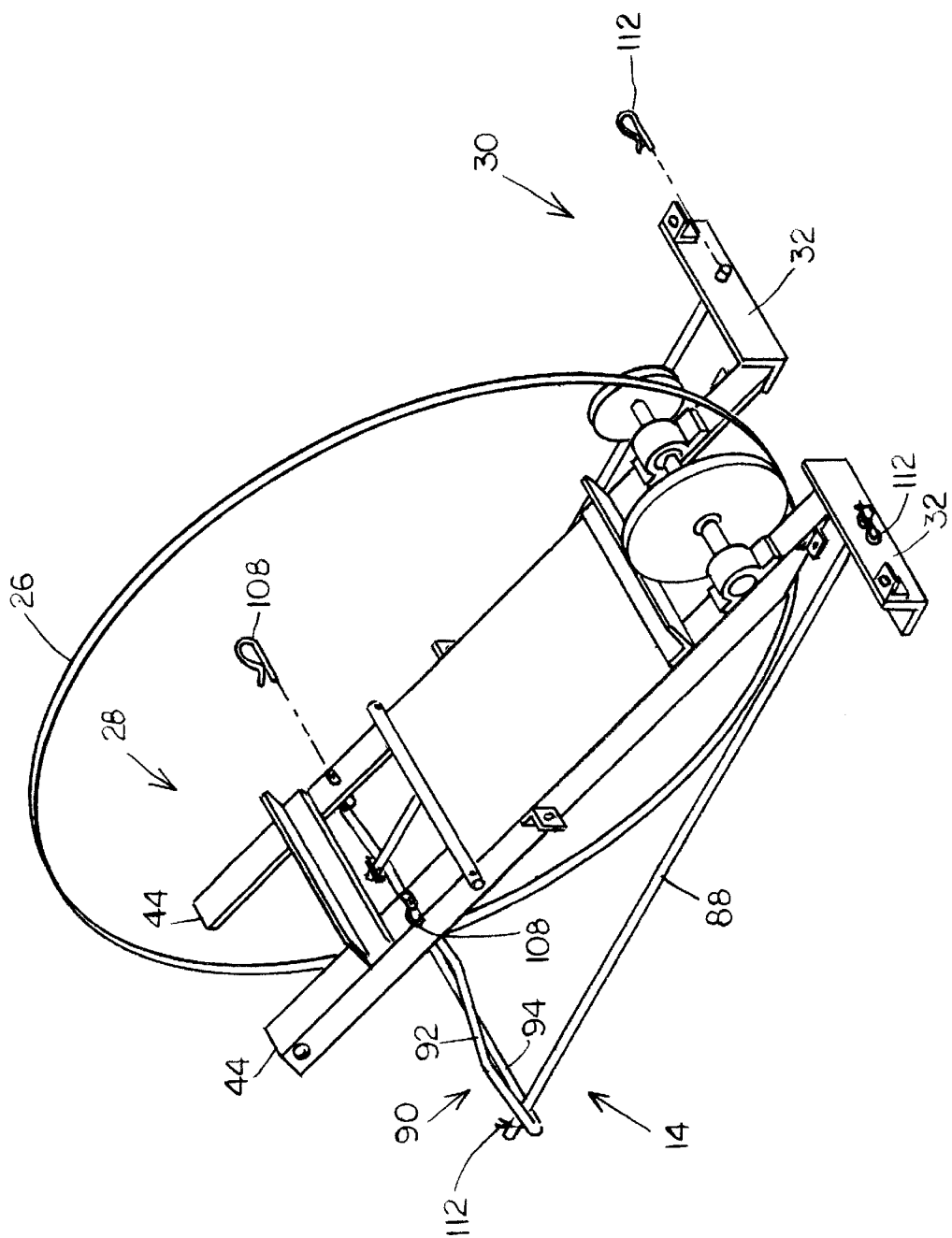
FIG. 5 is a front perspective view of the base of the band saw with a leg unit according to the present invention.
Figure 6:
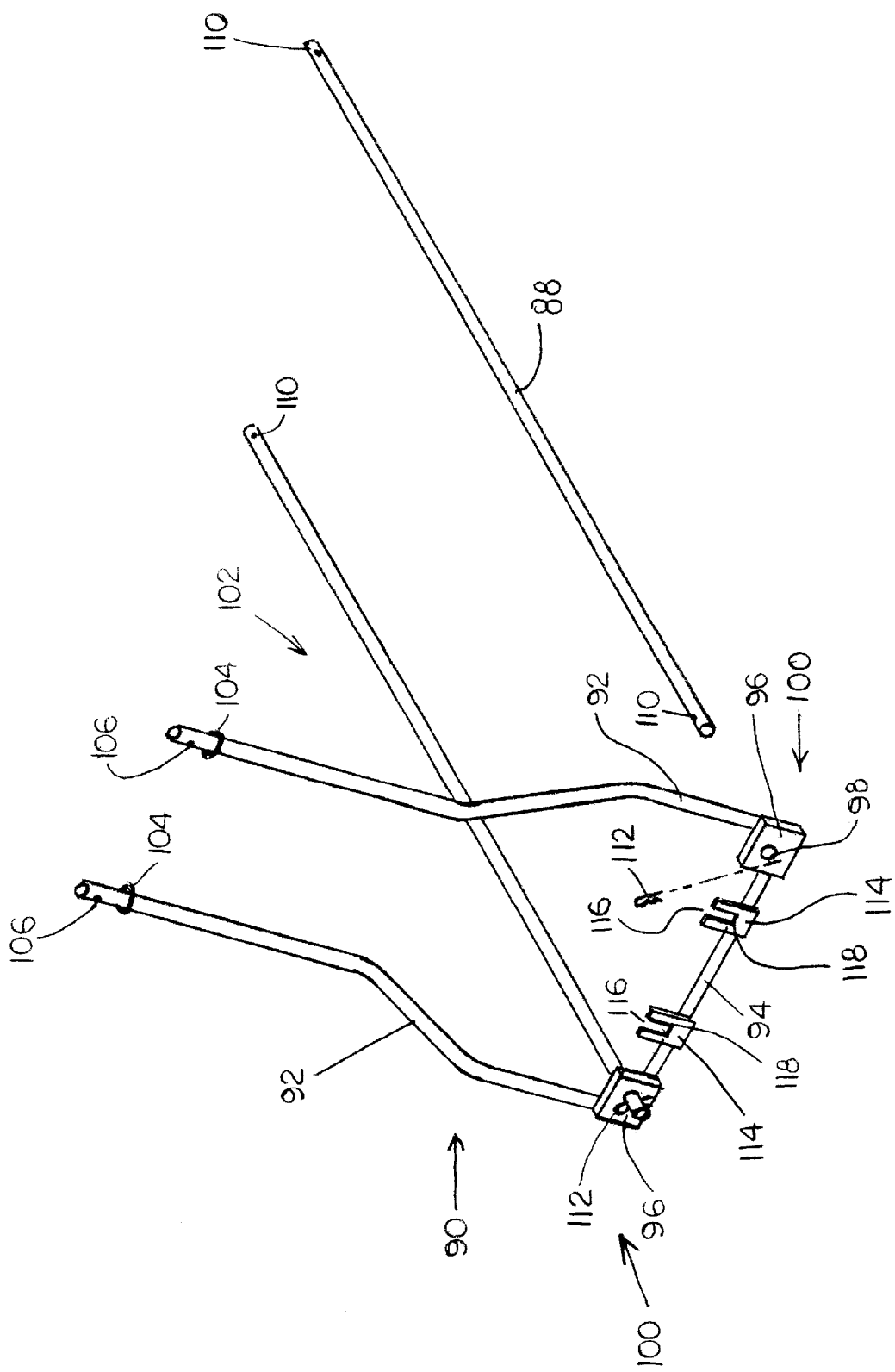
FIG. 6 is a rear perspective view of a leg unit of the band saw according to the present invention.

FIGS. 5 and 6 show the saw blade 26 and the leg unit 14. The saw blade 26 is of the continuous or endless length type used in band saws. The saw blade 26 is looped over one of the feet 32 at the bottom 30 of the base 12 and looped over one of the main supports 44 at the top 28 of the base 12, as shown in FIG. 5. The leg unit 14 includes two horizontal rods 88 and an upright assembly 90. The upright assembly 90 includes two vertical rods 92, a horizontal cross rod 94 and two rod brackets 96 with rod holes 98. The vertical rods 92 are connected together at the bottom 100 of the vertical rods 92 by the horizontal cross rod 94. The horizontal cross rod 94 serves as a rear part of the band saw 10 that contacts the surface which supports the band saw 10. The rod brackets 96 are attached to the corners of the upright assembly 90 where the vertical rods 92 and the horizontal cross rod 94 meet. The vertical rods 92 are bent inwardly at the top 102 so they can be inserted into the rod holes 82 of the base 12, as the horizontal cross rod 94 is longer than the width of the base 12 for stability. Stops 104 and pin holes 106 are included at the top 102 of each vertical rod 92. Once the vertical rods 92 are inserted into the rod holes 82, the stops 104 on the vertical rods 92 support the base 12. Then, pins 108 are inserted into pin holes 106 at the top 102 of the vertical rods 92 for securing the vertical rods 92 to the base 12. The horizontal rods 88 include pin holes 110 at each end of the horizontal rods 88. One end of the horizontal rods 88 is inserted into the rod holes 98 of the rod brackets 96 of the leg unit 14. The other ends of the horizontal rods 88 are inserted into the rod holes 38 of the feet 32 of the base 12. The horizontal rods 88 are secured by inserting pins 112 in the pin holes 110 of each end of the horizontal rods 88. Also, the horizontal cross rod 94 includes two U-slot brackets 114 positioned between the vertical rods 92. The U-slot brackets 114 have an opening 116 of a U-slot 118 facing upward.

Figure 7:
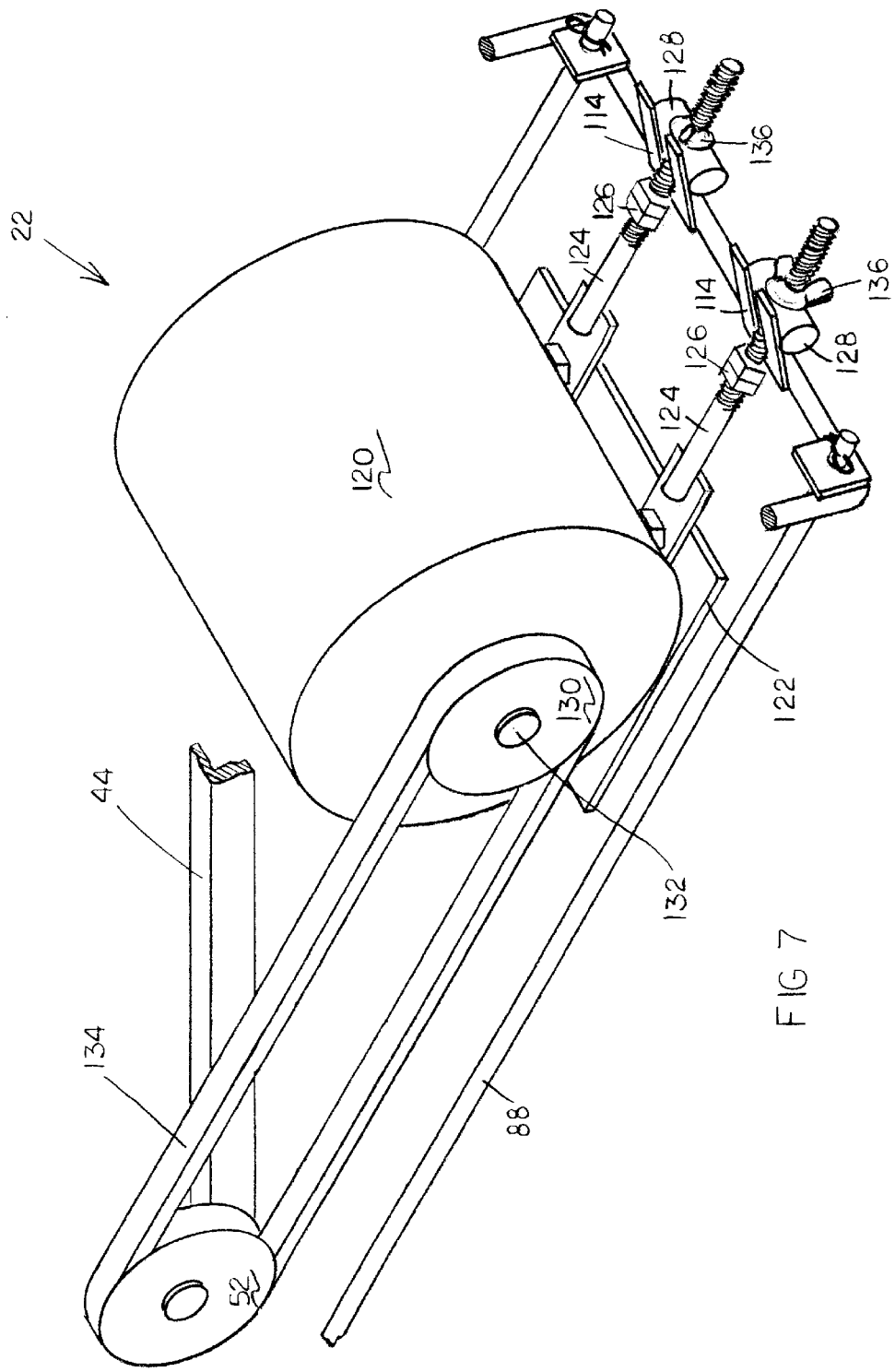
FIG. 7 is a rear perspective view of a power source of the band saw according to the present invention.

The power source assembly 22 assembly includes a motor 120 attached to a motor base 122, as shown in FIG. 7. The motor base 122 includes two threaded rods 124 attached to the motor base 122. Each threaded rod 124 includes a front stop 126 and a rear stop 128. The front stops 126 are shown as two nuts which screw on to the threaded rods 124. The rear stops 128 are shown as a short piece of rod which is drilled to allow the threaded rods 124 to pass through the rear stops 128. The power source assembly 22 is attached by sliding the threaded rods 124 down into the opening 116 of the U-shape slots 118 of the U-slot brackets 114. Whereby, the U-slot brackets 114 are between the front and rear stops 126, 128. The motor 120 includes a pulley 130 attached to the shaft 132 of the motor 120. A belt 134 is shown connected between the pulley 52 of the base 12 and the pulley 130 of the motor 120. Wing nuts 136 are used to secure the rear stops 128 against the U-slot brackets 114 and aid in providing tension on the belt 134. The tension on the belt 134 is adjusted by adjusting the front stops 126 on the threaded rods 124.

Figure 8:
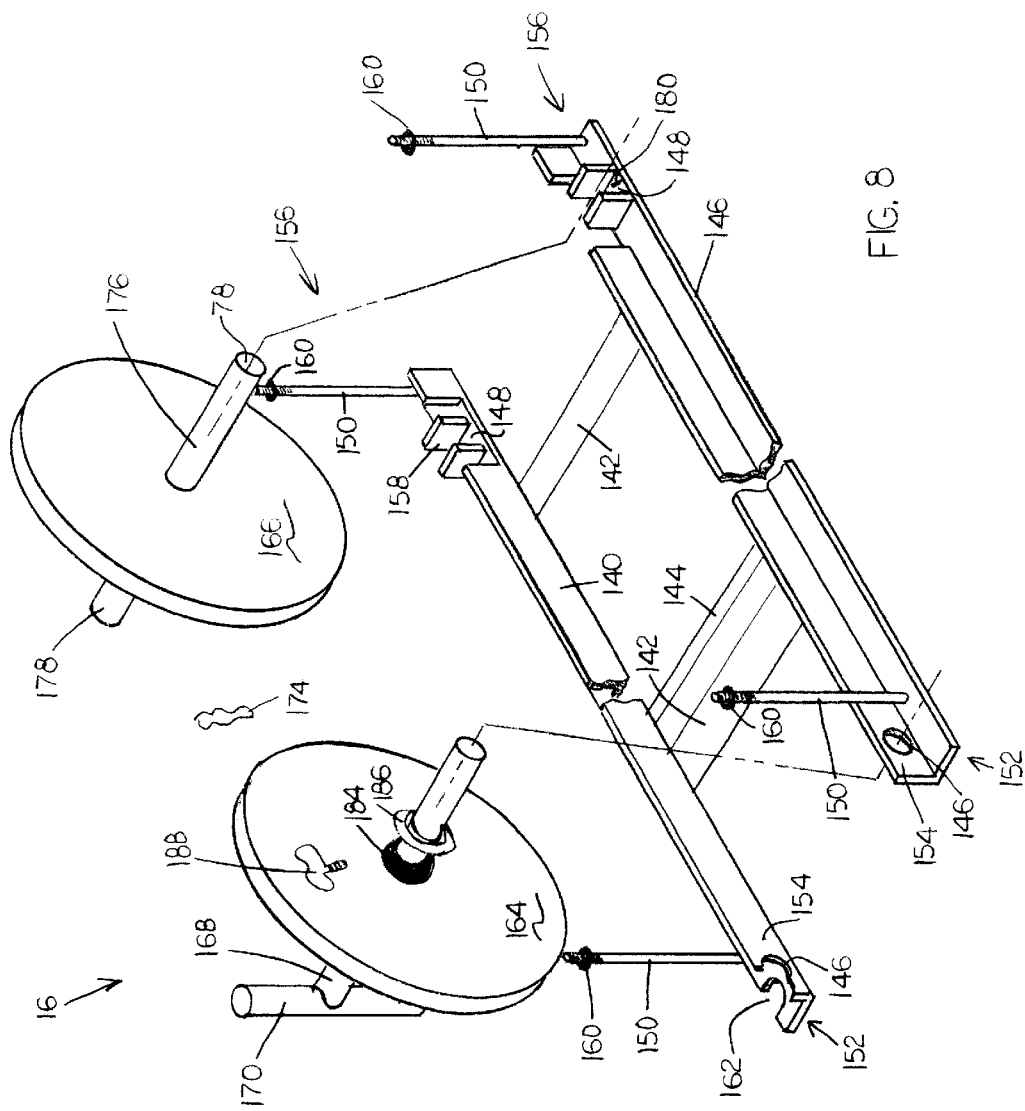
FIG. 8 is a top perspective view of an upper frame of the band saw according to the present invention.
Figure 9:
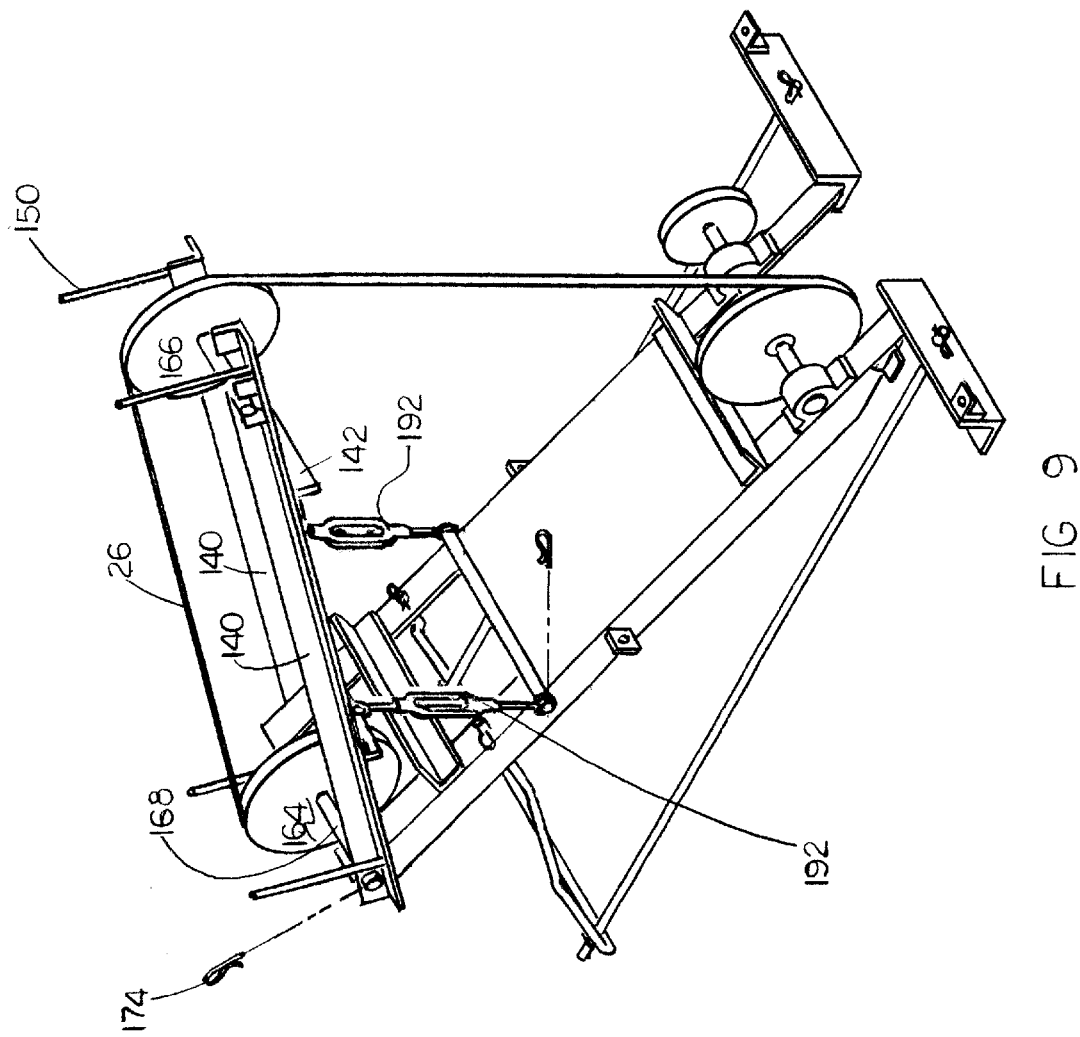
FIG. 9 is a front perspective view of the base of the band saw with the leg unit and the upper frame according to the present invention.

The upper frame 16 includes two rails 140 connected by two cross members 142, as shown in FIG. 8. The upper frame 16 also includes an upper frame support rod 144, an axle hole 146 on each rail 140, a U-shaped axle channel 148 on each rail 140 and two threaded guard supports 150 on each rail 140. Each axle hole 146 is located at a rear 152 and side 154 of the rails 140. Each U-shaped axle 148 channel is located at a front 156 of the rails 140 and has an open end 158 which extends upward. One of the threaded guard supports 150 is located near the rear 152 of the rail 140, while the other threaded guard supports 150 is located at the front 156 of the rail 140. The threaded guard supports 150 include nuts which act as stops 160. One of the rails 140 includes a notch 162 below the axle hole 146. As shown in FIG. 9, the upper frame 16 is assembled to the base 12 by inserting the top 28 of the base 12 between the rails 140 of the upper frame 16, such that the axle holes 146, 86 of the upper frame 16 and base 12 are aligned. The upper frame 16 is inserted such that the upper frame 16 is within the inside boundaries of the saw blade 26, whereby the saw blade 26 is looped over the lower wheel 50, a middle wheel 164 and an upper wheel 166.

As shown in FIG. 8, a T-axle 168 having a T-handle 170 on one end and a pin hole 172 on the other end is inserted through the axle holes 146, 86 on one side, through the middle wheel 164, and on through the other axle holes 146, 86. The T-handle 170 is positioned into the notch 162 on the rail 140 and a pin 174 is inserted into the pin hole 172 of the T-axle 168 to secure the T-axle 168 in place. The T-handle 170 and notch 162 combination prevents rotation of the T-axle 168. Therefore, the rear of the upper frame 16 and the top 26 of the base 12 are secured together. A wheel axle 176 having two ends 178 is shown in FIG. 8. Each end 178 is positioned into one of the U-shaped axle channels 148. One of the U-shaped axle channels 148 can include a pin 180 extending upward to engage a hole 182 in the wheel axle 176 to prevent side-to-side movement of the wheel axle 176. An upper wheel 166 is inserted over the wheel axle 176 before placement into the U-shaped axle channels 148. Since the wheel axles 168, 176 for the middle and upper wheels 164, 166 do not rotate, the middle and upper wheels 164, 166 have independent bearings at their center. The middle and upper wheels 164, 166 are secured in place with spacers 184 and collars 186 which lock down on the axles 168, 176. Wing bolts 188 are used to secure the collars 186 to the axles 168, 176.

Figure 10:
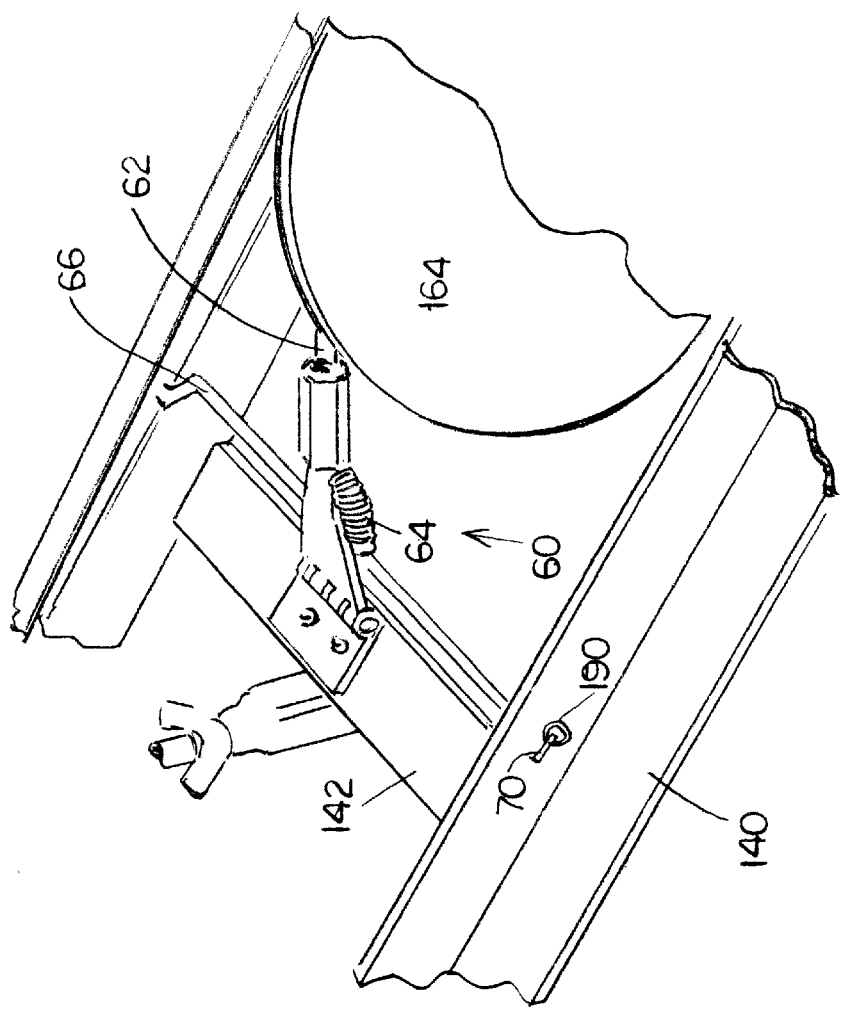
FIG. 10 is a top perspective view of a middle wheel of the band saw according to the present invention.
Figure 11:
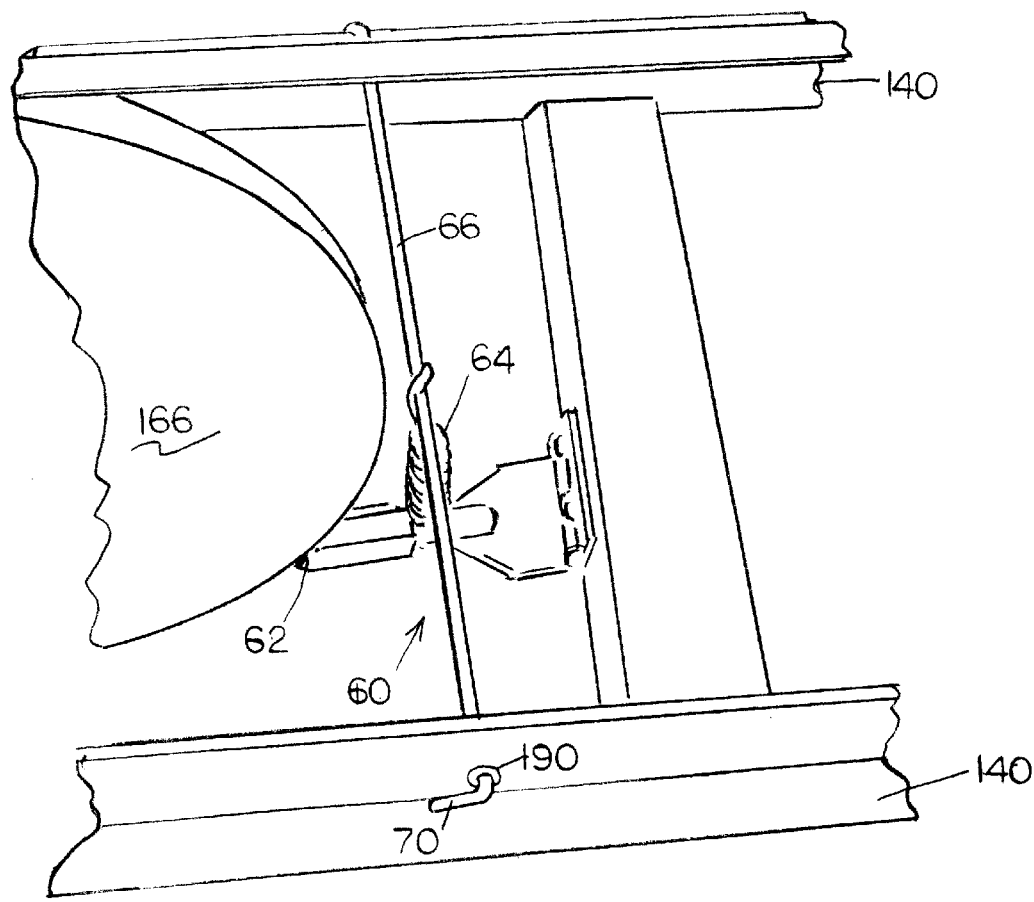
FIG. 11 is a top perspective view of an upper wheel of the band saw according to the present invention.

Each cross member 142 on the upper frame 16 is positioned near one of the wheels 164, 166, as each cross member 142 includes a scraper assembly 60. FIG. 10 shows a top view of the scraper assembly 60 for the middle wheel 164 hinged to the cross member 142. The scraper 62 is biased toward the top of the middle wheel 164 by the spring 64 connected between the scraper 62 and the spring rod 66 below the scraper 62. The spring rod 66 is attached to the rails 140. FIG. 11 shows a top view of the scraper assembly 60 for the upper wheel 166 hinged to the cross member 142. The scraper 62 is biased toward the bottom of the upper wheel 166 by the spring 64 connected between the scraper 62 and the spring rod 66 above the scraper 62. The spring rod 66 is attached to the rails 140. In both cases of the scraper assemblies 60, the spring rod 66 is attached to the rails 140 by inserting the spring rod 66 into holes 190 in the rails 140. The ends 70 of the spring rods 66 are shown bent so that the spring rods 66 do not fall from the rails 140. The scrapers 62 are used to remove anything clinging to the middle or upper wheels 164, 166.

Figure 12:
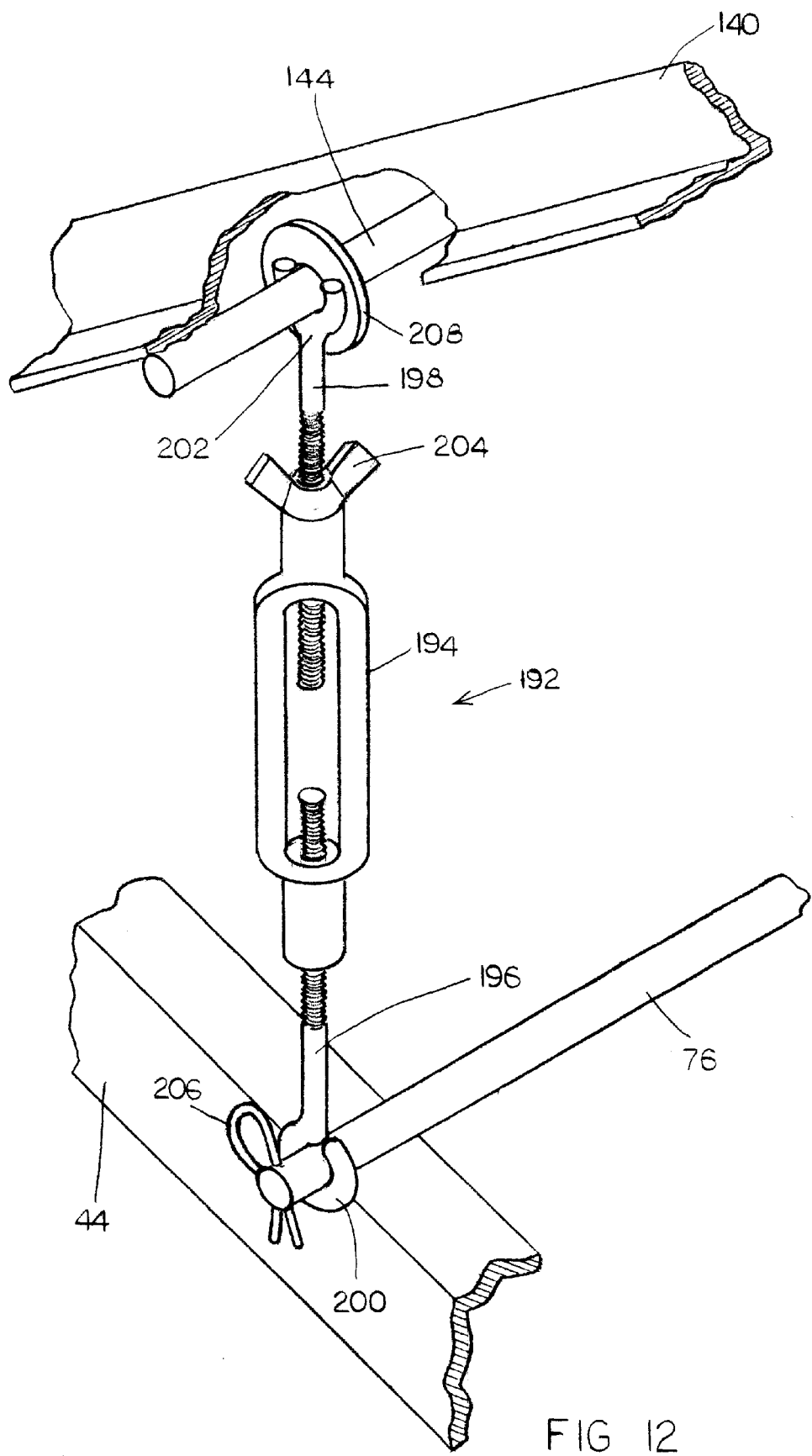
FIG. 12 is a side perspective view of an adjustable support assembly of the band saw according to the present invention.

Once the rear 152 of the upper frame 16 is attached to the base 12, two turnbuckles assemblies 192 are placed between the upper frame 16 and the base 12. As shown in FIG. 12, each turnbuckle assembly 192 includes a turnbuckle 194 with a bottom threaded rod 196 and a top threaded rod 198. The bottom threaded rod 196 includes an eye end 200 and the top threaded rod 198 includes a U-shaped end 202. Each turnbuckle assembly 192 also includes a wing nut 204 threaded onto the top threaded rod 196. The eye end 200 of each turnbuckle assembly 192 is placed onto one of the ends of the upper frame support rod 76 of the base 12, such that eye end 200 it is against one of the main supports 44. A pin 206 is then inserted into the pin hole 78 of the upper frame support rod 76 to secure the eye end 200 to the base 12. FIG. 12 shows a washer 208 welded in place on the upper frame support rod 144 of the upper frame 16. The upper frame 16 is raised enough above the base 12 so that the U-shaped end 202 of the top threaded rod 198 can be placed under the upper frame support rod 144 between the washer 208 and the rail 140 of the upper frame 16. The washer 208 acts as a stop to secure the U-shaped end 202 of the top threaded rod 198 in place. The height of the upper frame 16 is adjusted by turning the turnbuckle 194, which when raised, provides the required tension on the saw blade 26 by increasing the distance between the upper and lower wheels 166, 50. The wing nut 204 is tighten against the turnbuckle 194 to lock it in position.

Figure 13:
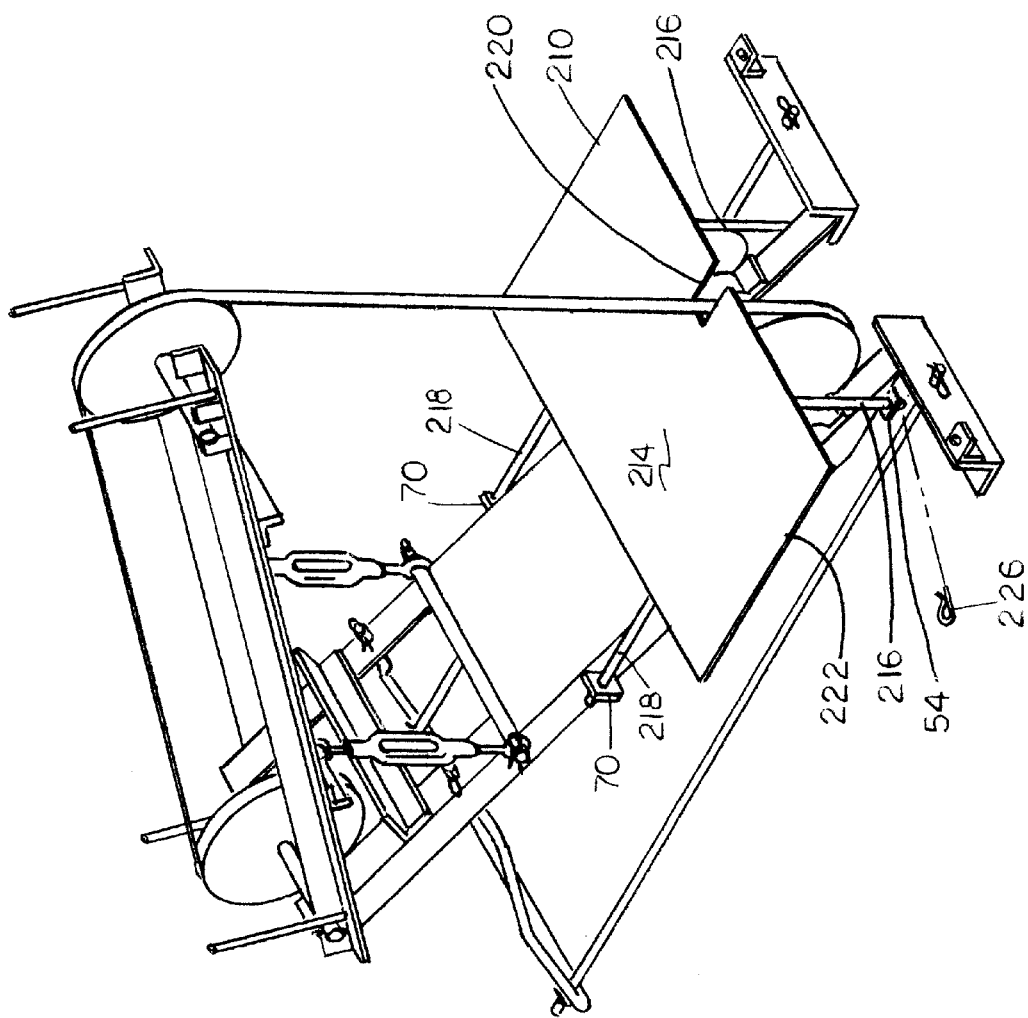
FIG. 13 is a front perspective view of the base of the band saw with the leg unit, the upper frame and a stationary section of a cutting table according to the present invention.
Figure 14:
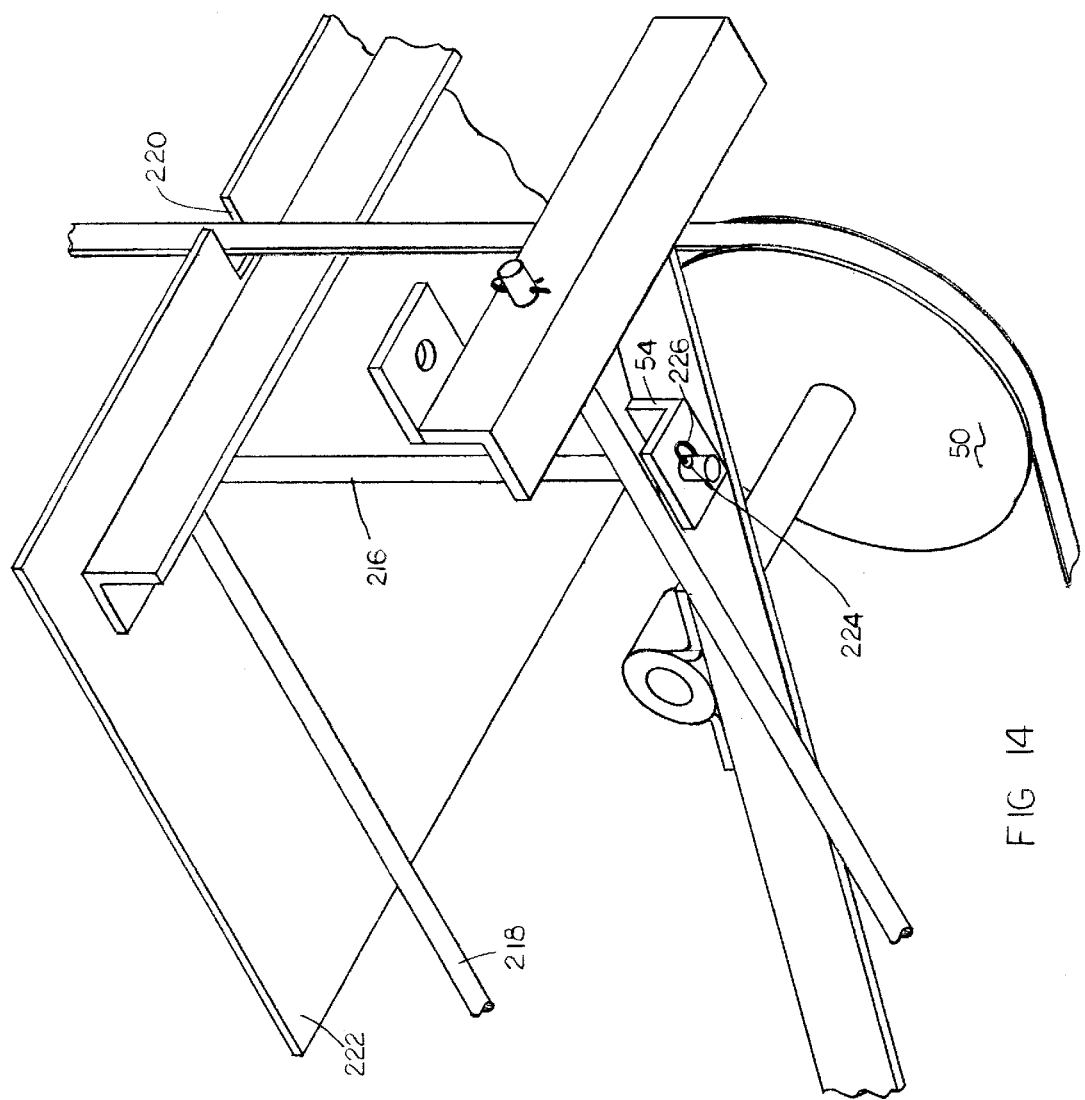
FIG. 14 is a bottom perspective view of the stationary section of the cutting table attached to the base of the band saw according to the present invention.

The cutting table 20 includes a stationary section 210 and a movable section 212. The stationary section 210 includes a top 214, two vertical rods 216 and two horizontal rods 218, as shown in FIGS. 13–14. The top 214 includes a blade notch 220 to allow the saw blade 26 to pass. The vertical rods 216 extend downward from a bottom surface 222 of the top 214. The horizontal rods 218 extend rearward from the bottom surface 222 of the top 214. The stationary section 210 is installed by placing the horizontal rods 218 into the rod holes 72 of the upper main support rod bracket 70. The upper main support rod brackets 70 are rotated and the position of the horizontal rods 218 is adjusted in the upper main support rod brackets 70, so that the vertical rods 216 can be placed into the rod holes 56 of the lower main support rod bracket 54. The vertical and horizontal rods 216, 218 include pin holes 224 at their ends which receive pins 226 to secure the vertical and horizontal rods 216, 218 from being removed. Also, the vertical rods 216 are long enough to reach the surface that supports the band saw 10, thereby providing support for the stationary section 210.

Figure 15:
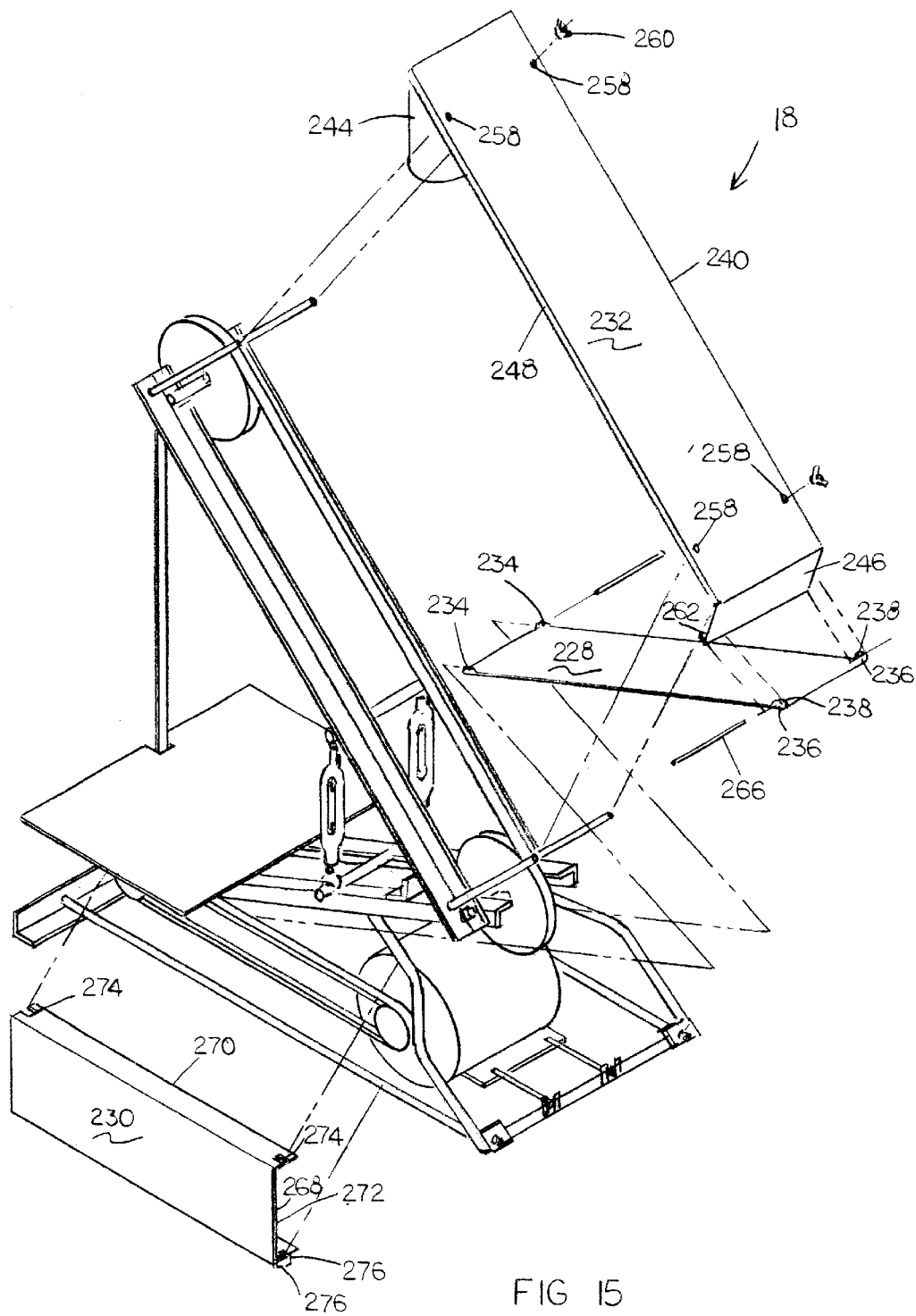
FIG. 15 is a front perspective view of the base of the band saw with the leg unit, the upper frame the stationary section of the cutting table and safety guards according to the present invention.
Figure 16:
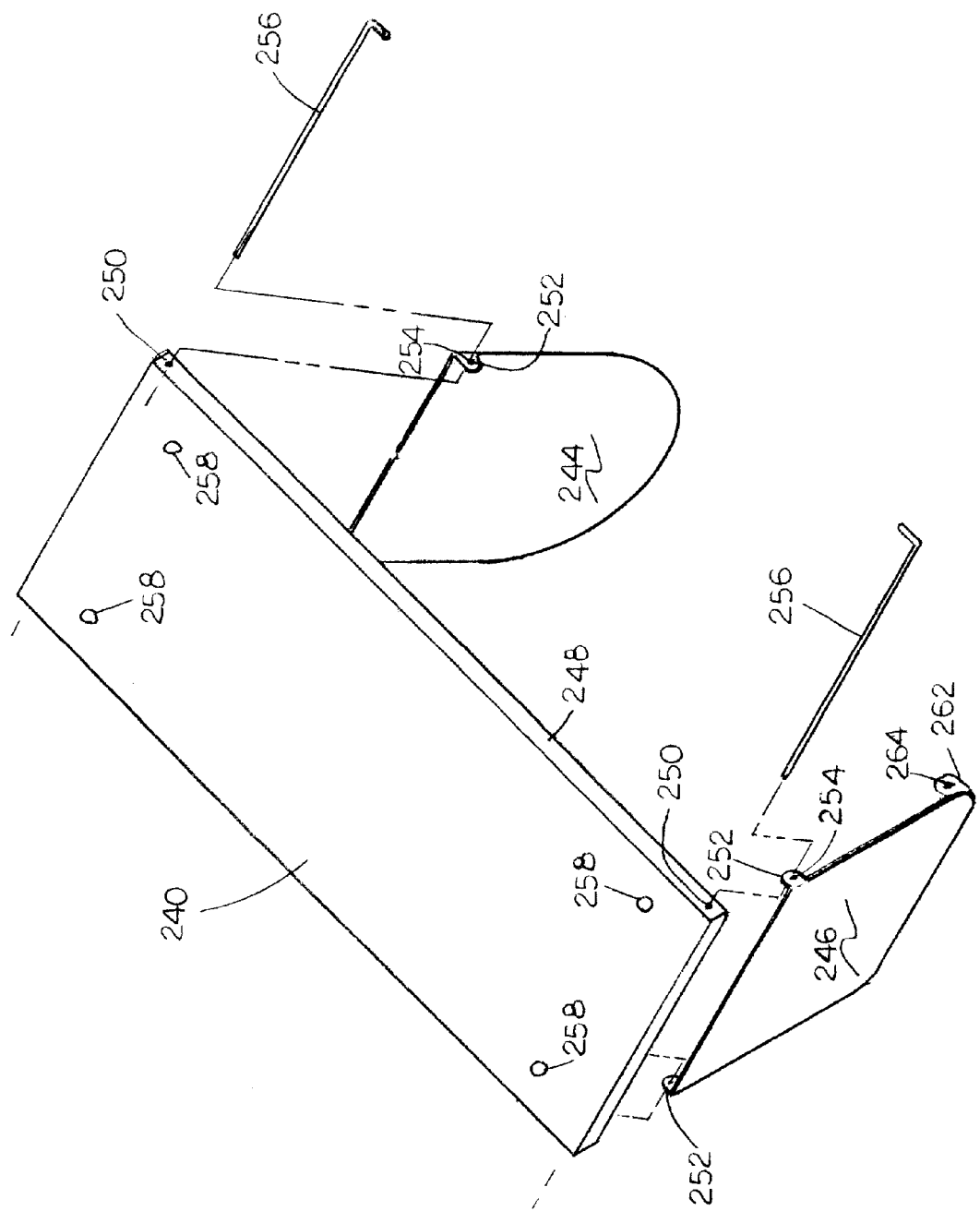
FIG. 16 is an exploded view of a blade cover of the band saw according to the present invention.

After the stationary section 210 of the cutting table 20 is installed, the safety guards 18 show in FIG. 15–16 can be installed. The safety guards 18 include an motor cover 228, a belt cover 230 and a blade cover 232. The motor cover 228 includes two front notches 234 and two rear ears 236 with rod holes 238. The motor cover 228 is placed between the motor 120 and the base 12, such that the front notches 234 engage the horizontal rods 88 of the leg unit 14. The blade cover 232 includes a main section 240 with a front end section 244 and a rear end section 246 hinged at the ends of the main section 240. The main section 240 includes two sides 248 extending downward from the main section 240 with holes 250 at the front and rear of the sides 248. The front and rear end sections 244, 246 include ears 252 with holes 254 that are hinged to the main section 240 with hinge pins 256 through the ear holes 254 and the holes 250 of the sides 248, as shown in FIG. 16. The main section 240 includes four holes 258 to receive the threaded guard supports 150 from the rails 140 of the upper frame 16. The blade cover 232 is placed over the threaded guard supports 150 such that the blade cover 232 rests on the stops 160 of the threaded guard supports 150. The blade cover 232 is secured using wing nuts 260 threaded onto the threaded guard supports 150. The rear end section 244 includes ears 262 with holes 264 which are aligned with the ears 236 of the motor cover 228 to receive a hinge pin 266. The hinge pin 266 secures the motor cover 228 in place. The belt cover 230 includes a side 268, a top 270 and a bottom 272. The top 270 includes two notches 274 and the bottom 272 includes two sets of flanges 276 extending downward. The belt cover 230 is installed by placing the flanges 276 of the bottom 272 over the horizontal rod 88 of the leg unit 14 which is next to the belt 134 of the power source assembly 22. Then, one notch 274 of the top 270 engages the vertical rod 92 of the leg unit 14, while the other notch 274 engages the vertical rod 216 of the stationary section 210 of the cutting table 20.

Figure 17:
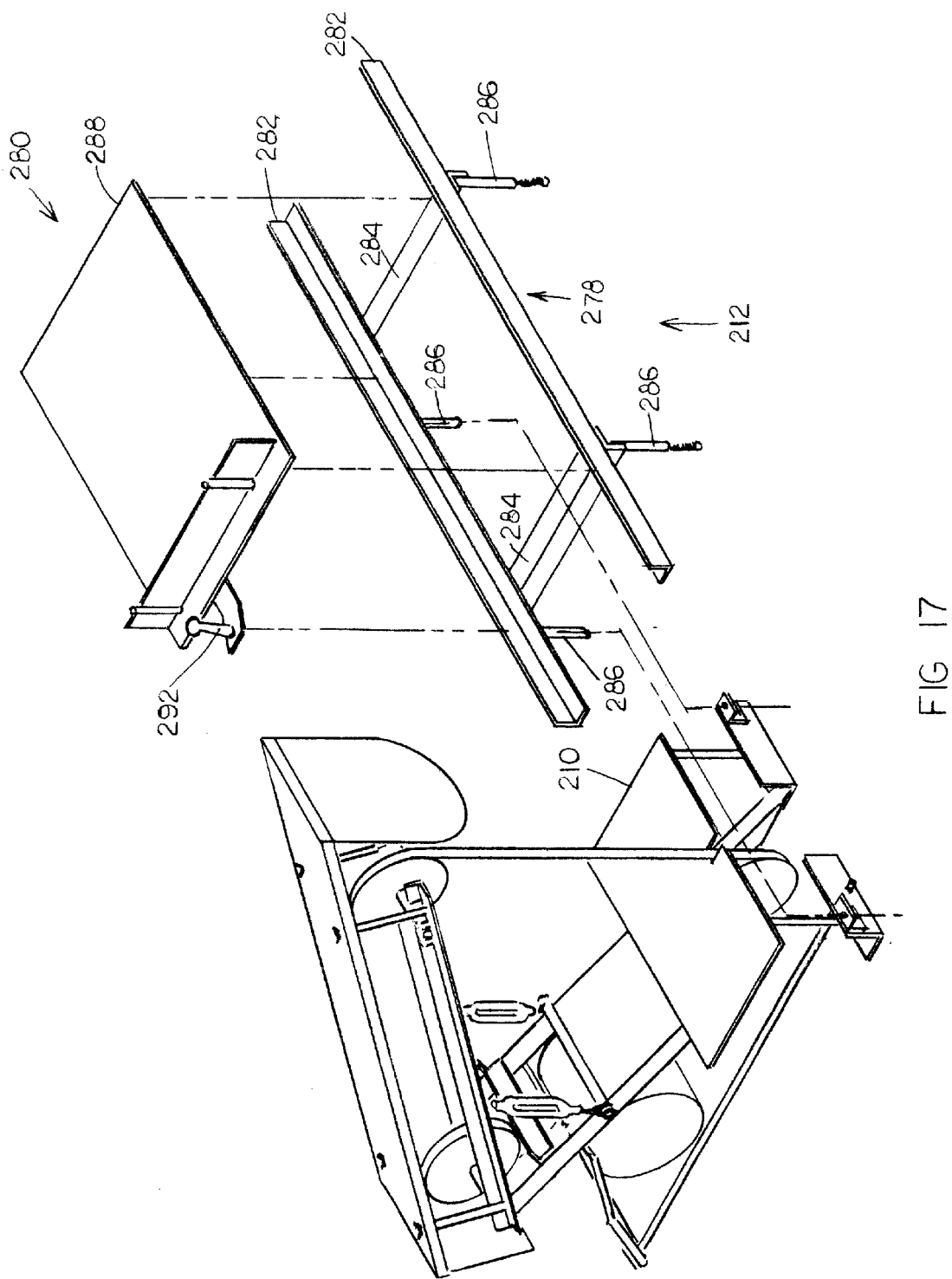
FIG. 17 is an exploded view of a movable section of the cutting table of the band saw according to the present invention.
Figure 18:
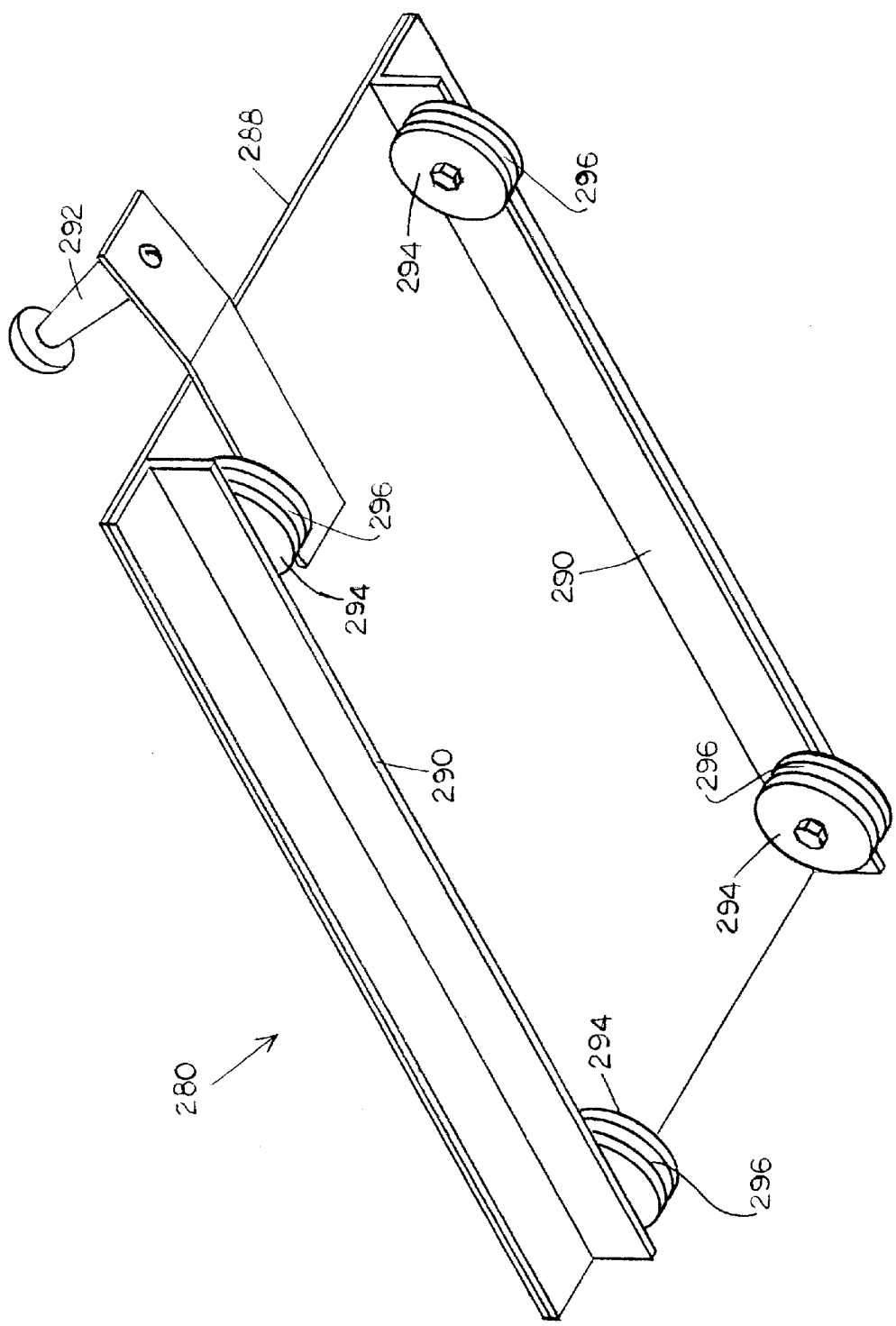
FIG. 18 is a bottom perspective view of a sliding top of the movable section of the band saw according to the present invention.

The movable section 212 of the cutting table 20 includes a base 278 and a sliding top 280, as shown in FIGS. 17–18. The base 278 includes two rails 282 connected by cross members 284. Legs 286 extend downward from the cross members 284. The legs 286 on one side of the base 278 are rods that are positioned to be place into the rod holes 42 of the foot rod brackets 40. The four legs 286 can be of an adjustable 20 type. The sliding top 280 includes a plate 288 with two rails 290 extending downward and a handle 292. Each rail 290 includes two wheels 294 having recessed center sections 296. The sliding top 280 is placed on the base 278 such that the recessed center sections 296 of the wheels 294 ride on the rails 282 of the base 278. By pushing or pulling the handle 292, the sliding top 280 can be moved back and forth along the stationary section 210 of the cutting table 20.

Figure 19:
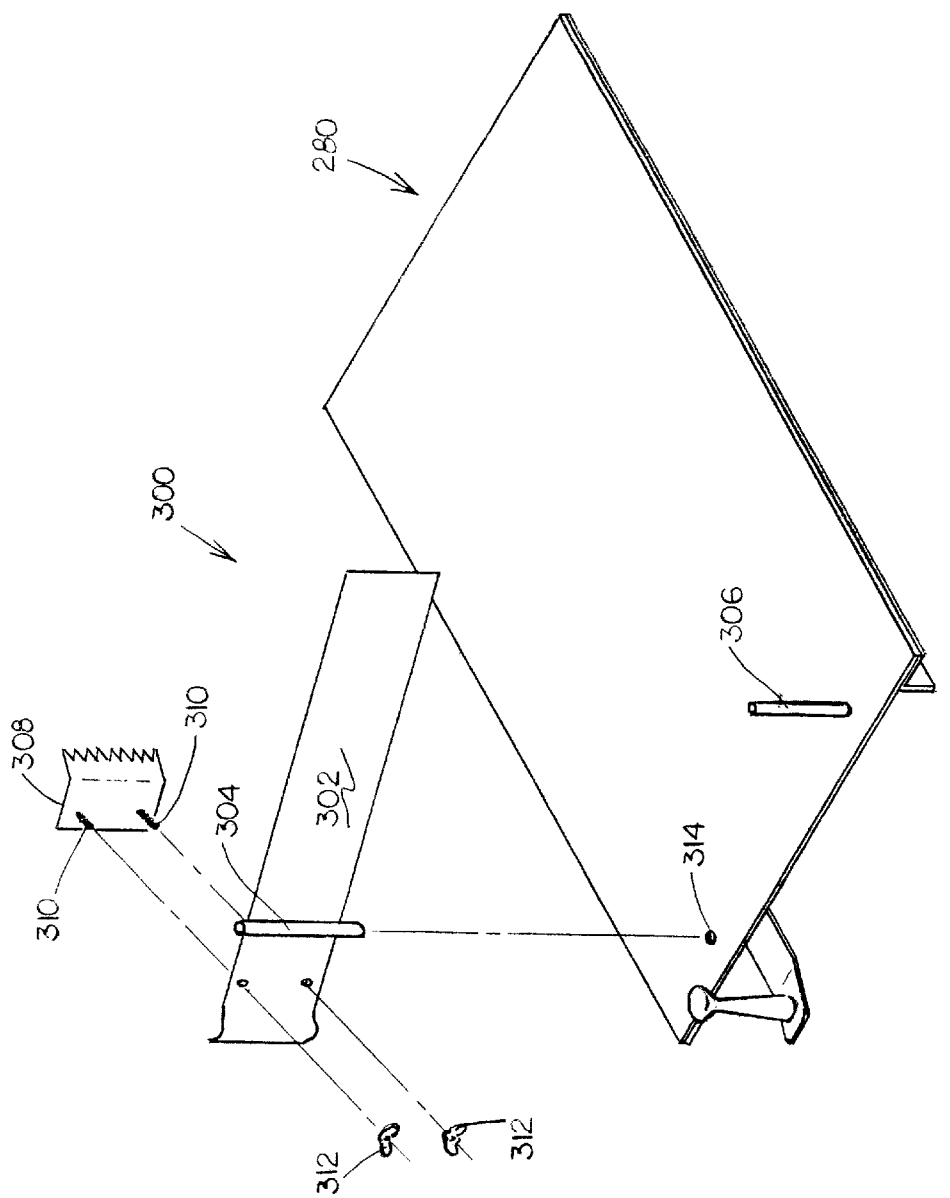
FIG. 19 is a top exploded view of the sliding top of the movable section of the band saw according to the present invention.
Figure 20:
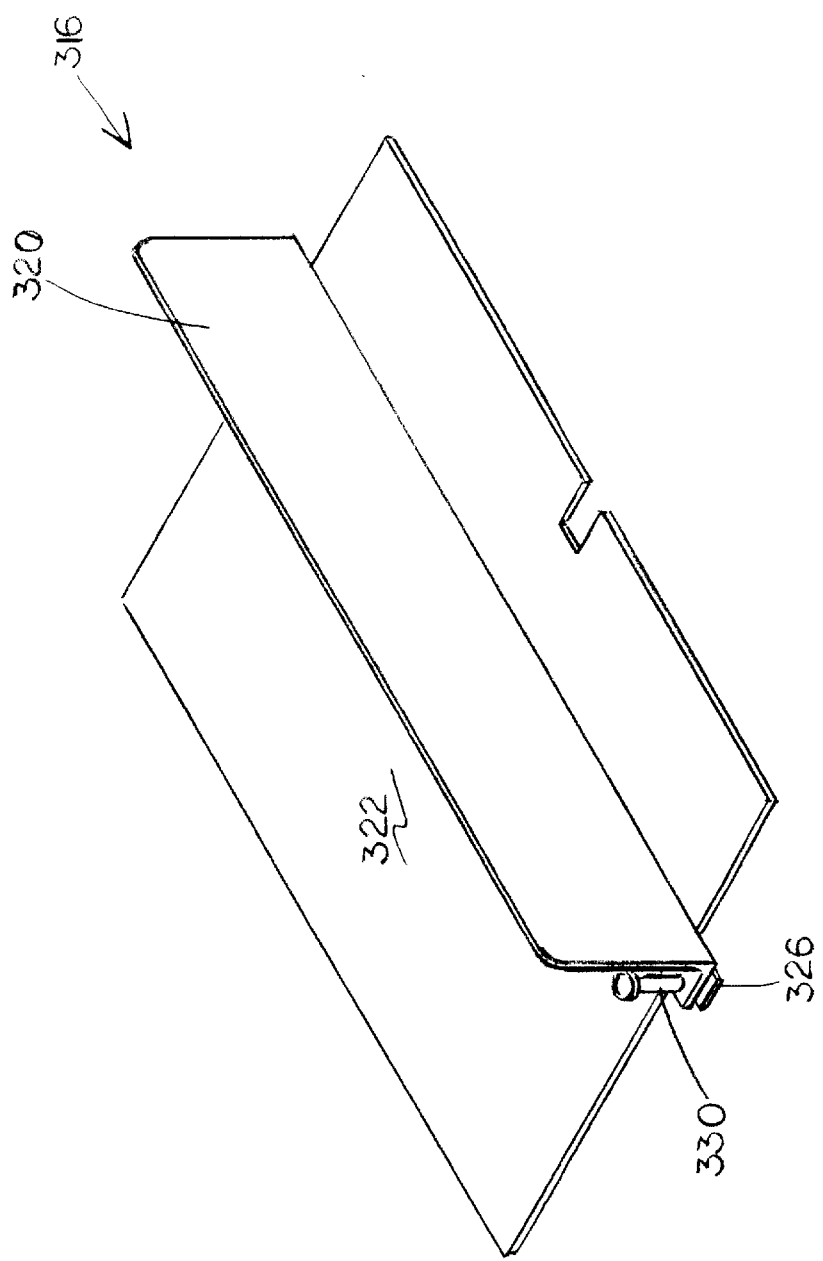
FIG. 20 is a top perspective view of the stationary section of the band saw with a thickness guide according to the present invention.

Accessories for the cutting table 20 are shown in FIGS. 19–21. FIG. 19 shows a push guide assembly 300 on the sliding top 280 to aid in pushing the meat to be cut. The push guide assembly 300 includes a guide plate 302, rotation pin 304, stop 306 and meat claw 308. The meat claw 308 is mounted to the guide plate 302 with screws 310 and wing nuts 312. The meat claw 308 is used to engage the meat. The rotation pin 304 is attached to the guide plate 302 near one end of the guide plate 302. The rotation pin 304 is inserted into a hole 314 in the sliding top 280 to rotatably secure the guide plate 302 to the sliding top 280. The stop 306 extends upward from the sliding top 280 and restricts the guide plate 302 from rotating pass the end of the sliding top 280. FIGS. 20 and 21 show a thickness guide 316 for the stationary section 210 of the cutting table 20. The thickness guide 316 is used to adjust the thickness of the portion of meat to be cut. The thickness guide 316 includes a base 318 and face 320 extending upward from the base 318. The base 318 is positioned on a top surface 322 of the top 214 of the stationary section 210. The base 318 extends beyond the top 214 and includes two holes 324 which are located in the area beyond the top 214. Two nut flanges 326 having threaded holes 328 engage the bottom surface 222 of the top 214. Thumb screws 330 are inserted into the holes 324 of the base 318 and threaded into the holes 328 of the nut flanges 326 to secure the thickness guide 316 to the top 214.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of any and all equivalents thereof.

I claim:

1. A band saw comprising:
    a saw blade;
    a base having a front and rear;
    an upper frame having a front and a rear, said rear of said upper frame pivotally connected to said rear of said base;
    a lower wheel mounted to said base near said front of said base to carry said saw blade and support movement of said saw blade;
    a middle wheel mounted near said rear of said base and upper frame to carry said saw blade and support movement of said saw blade;
    an upper wheel mounted to said upper frame near said front of said upper frame to carry said saw blade and support movement of said saw blade;
    adjustable support assembly between said base and upper frame to support said upper frame above said base and to allow adjustment of distance between said lower and upper wheels to provide tension on said saw blade and said adjustable support assembly having components which attach to said base and upper frame which allow quick assembly and disassembly of said band saw to make said band saw portable;
    a cutting table to support an object to be cut attached to said base; and
    a power source to drive said wheels.

2. The band saw of claim 1, wherein said adjustable support assembly includes at least one threaded rod which can be turned to adjust said distance between said lower and upper wheels.

3. The band saw of claim 1, wherein said adjustable support assembly includes at least one turnbuckle having two threaded rods to adjust said distance between said lower and upper wheels.

4. The band saw of claim 3, wherein said threaded rods have an eye end and said base and upper frame each include an upper frame support rod to receive said eye ends.

5. The band saw of claim 3, wherein said threaded rods have a U-shaped end and said base and upper frame each include an upper frame support rod to receive said U-shaped ends.

6. The band saw of claim 3, wherein one of said threaded rods has a U-shaped end, the other threaded rod has an eye end and said base and upper frame each include an upper frame support rod to receive said U-shaped and eye ends.

7. The band saw of claim 1, further including a leg unit to support said base, said leg unit comprising a upright assembly and two horizontal rods; said upright assembly including two vertical rods, a horizontal cross rod connecting bottoms of said vertical rods, rod brackets with rod holes; and wherein one end of said horizontal rods are connected to said rod brackets and the other end of horizontal rods are connected to said base.

8. The band saw of claim 1, wherein said base includes:
    two feet;
    two main supports, wherein a main support extend from each of said feet;
    a lower cross member connected between said main supports;
    an upper cross member connected between said main supports; and
    a upper frame support connected to each of said main supports to engage said adjustable support assembly.

9. The band saw of claim 1, wherein said base includes:
    two feet, said feet including two rod holes and two rod brackets with two rod holes;
    two main supports, wherein a main support extends from each of said feet;
    a lower cross member connected between said main supports;
    an upper cross member connected between said main supports;
    a lower main support rod bracket extending from each of said main supports, said lower main support rod bracket including a rod hole;
    an upper main support rod bracket extending from each of said main supports, said upper main support rod bracket including a rod hole; and
    a upper frame support connected to each of said main supports to engage said adjustable support assembly.

10. The band saw of claim 1, wherein each of said main supports includes an axle hole near said rear of said main support.

11. The band saw of claim 1, wherein said upper frame includes:
    two rails having a front and a rear;
    a cross member connecting said rails near said front of said rails;
    a cross member connecting said rails near said rear of said rails;
    a rear axle connected to said rails to support said middle wheel; and
    a front axle connected to said rails to support said upper wheel.

12. The band saw of claim 1, wherein said upper frame includes:
    two rails having a front and a rear;
    a cross member connecting said rails near said front of said rails;
    a cross member connecting said rails near said rear of said rails;
    a rear axle to support said middle wheel
    an axle hole on each of said rails to support said rear axle, said axle hole located near said rear of said rail;
    a front axle to support said upper wheel; and
    a U-shaped axle channel on each of said rails to support said front axle, said U-shaped axle channel located near said front of said rail.

13. The band saw of claim 9, wherein said cutting table comprises, a stationary section and a movable section, said stationary section including a top, two vertical rods extending downward from said top to engage said rod holes of said lower main support rod brackets and two horizontal rods extending rearward from said top to engage said upper main support rod brackets.

14. The band saw of claim 13, wherein said movable section comprises:
- a base, said base including two rails connected by two cross members and including four legs extending downward from said base of said movable section, said legs on one side of said base of said movable section are rods that are positioned to be place into said rod holes of said rod bracket of said feet; and
- a sliding top, said sliding top including a plate with two rails extending downward, said rails each including two wheels having recessed centers sections, such that said sliding top can be placed on said base of said movable section, whereby said recessed centers sections of said wheels ride on said rails of said base of said movable section.

15. The band saw of claim 7, wherein said power source comprises:
- a motor attached to a motor base, said motor base including two threaded rods extending from said motor base, each of said threaded rods including a front stop and a rear stop, and wherein said horizontal cross rod of said leg unit includes two motor brackets to receive said threaded rods and further including wing nuts to secure said rear stops against said motor brackets of horizontal cross rod.

16. A band saw comprising:
- a saw blade
- a base having a front and rear two feet, a main support extending from each of said feet, a lower cross member connected between said main supports, an upper cross member connected between said main supports, a upper frame support connected to each of said main supports;
- an upper frame having a front and a rear, said rear of said upper frame pivotally connected to said rear of said base;
- a lower wheel mounted to said base near said front of said base to support movement of said saw blade;
- a middle wheel mounted near said rear of said base and upper frame to support movement of said saw blade;
- an upper wheel mounted to said upper frame near said front of said upper frame to support movement of said saw blade,
- adjustable support assembly between said base and upper frame which engages said upper frame support of said base, supports said upper frame above said base, allows adjustment of distance between said lower and upper wheels to provide tension on said saw blade, said adjustable support assembly including at least one turnbuckle having two threaded rods to adjust said distance between said lower and upper wheels;
- a cutting table to support an object to be cut attached to said base;
- a power source to drive said wheels;
- wherein said upper frame includes two rails having a front and a rear, a cross member connecting said rails near said front of said rails, a cross member connecting said rails near said rear of said rails, a rear axle to support said middle wheel, and a front axle to support said upper wheel.

17. The band saw of claim 16, wherein one of said threaded rods has a U-shaped end, the other threaded rod has an eye end and said base and upper frame each include an upper frame support rod to receive said U-shaped and eye ends.

18. The band saw of claim 16, further including a leg unit to support said base, said leg unit comprising a upright assembly and two horizontal rods; said upright assembly including two vertical rods, a horizontal cross rod connecting bottoms of said vertical rods, rod brackets with rod holes; and wherein one end of said horizontal rods are connected to said rod brackets and the other end of horizontal rods are connected to said base.

19. The band saw of claim 16, wherein each of said rails of said upper frame and each of said main supports of said base includes an axle hole at said rear to receive said rear axle, which pivotally connects said rear of said base to said rear of said upper frame.

20. The band saw of claim 16, further including a leg unit to support said base, said leg unit comprising a upright assembly and two horizontal rods; said upright assembly including two vertical rods, a horizontal cross rod connecting bottoms of said vertical rods, rod brackets with rod holes; and wherein one end of said horizontal rods are connected to said rod brackets and the other end of horizontal rods are connected to said base.

* * * * *